United States Patent [19]

Foris et al.

[11] 4,001,140
[45] Jan. 4, 1977

[54] CAPSULE MANUFACTURE

[75] Inventors: Peter L. Foris; Robert W. Brown; Paul S. Phillips, Jr., all of Appleton, Wis.

[73] Assignee: NCR Corporation, Dayton, Ohio

[22] Filed: July 10, 1974

[21] Appl. No.: 487,322

[52] U.S. Cl. .............................. 252/316; 427/151; 427/152
[51] Int. Cl.² ......................................... B01J 13/02
[58] Field of Search ............ 252/316; 427/151, 152

[56] References Cited

UNITED STATES PATENTS

| | | | |
|---|---|---|---|
| 3,074,845 | 1/1963 | Geary | 424/32 X |
| 3,151,027 | 9/1964 | Cooley et al. | 424/32 X |
| 3,449,228 | 6/1969 | Yurcheshen et al. | 204/181 |
| 3,607,775 | 9/1971 | Yoshida et al. | 252/316 |

*Primary Examiner*—Richard D. Lovering
*Attorney, Agent, or Firm*—E. Frank McKinney

[57] ABSTRACT

A process is disclosed for performing encapsulation, en masse, by an in situ polymerization reaction to yield capsule wall material. The polymerization includes a reaction between urea and formaldehyde in an aqueous vehicle and the reaction is conducted in the presence of negatively-charged, carboxyl-substituted, linear aliphatic hydrocarbon polyelectrolyte material dissolved in the vehicle. Liquid-liquid phase separation is accomplished and maintained by increase in the molecular weight of the urea/formaldehyde reaction product without further dilution of the manufacturing vehicle. The negatively-charged polyelectrolyte material is required and has an apparent effect of controllng or modifying the polymerization reaction. The disclosed encapsulation process permits manufacture of microcapsules in concentrations of capsule to capsule manufacturing vehicle higher than previously possible.

8 Claims, No Drawings

CAPSULE MANUFACTURE

BACKGROUND OF THE INVENTION

1. Field of the Invention

This invention pertains to a process for manufacturing minute capsules, en masse, in a liquid manufacturing vehicle. The process involves liquid-liquid phase separation of a relatively concentrated solution of polymeric material to be used in formation of walls for the minute capsules.

En masse processes for the manufacture of microcapsules have generally required large amounts of liquid manufacturing vehicle and have generally resulted in low yields of capsules. An encapsulating system and process which utilizes relatively small amounts of manufacturing vehicle to generate relatively large amounts of microcapsules would be valuable from several viewpoints. For example, costs of transporting the capsule product, as manufactured, would be reduced because the product contains less vehicle. As another example, in the case where the capsule product is to be coated to a dried film on a sheet substrate, coating costs are reduced because there is less liquid vehicle to be removed from the substrate.

Many combinations of materials have been used in the past in search of compositions which yield certain physical characteristics in capsule walls or which permit performing the encapsulating process under certain desired or required conditions. As examples of desirable capsule characteristics, small size, impermeability of capsule walls to diffusion and strength of capsule walls to withstand normal handling forces can be mentioned. As examples of desirable process conditions, relatively high pH, relatively short times, and relatively high yield and concentration are important.

It is, therefore, an object of the present invention to provide a capsule manufacturing process wherein capsules are produced in high yield and in increased concentration. It is, additionally, an object of the invention to provide a process which requires a relatively short time for completion and which utilizes process conditions of increased convenience.

It is, further, an object of the present invention to provide a process for manufacturing microcapsules, which microcapsules have capsule walls of increased impermeability. Additionally, it is an object of this invention to provide a process for manufacturing very small capsules having predominantly singleparticle capsule core entities.

Specifically, it is an object of this invention to provide an encapsulating process wherein the capsule wall material includes a urea/formaldehyde polymeric material wherein the urea/formaldehyde wall material is generated by an in situ condensation reaction. It is, further, an object of this invention to provide such capsule wall material by an improved condensation reaction conducted in the presence of a negatively-charged, carboxyl-substituted, linear aliphatic hydrocarbon polyelectrolyte material dissolved in the capsule manufacturing vehicle.

2. Description of the Prior Art

South African Patent No. 62/939 issued Mar. 6, 1972 and corresponding in most respects to U.S. Pat. No. 3,516,941, discloses a preparation of microcapsules by in situ polymerization of amides or amines and aldehydes. There is no disclosure of the use of a negatively-charged polyelectrolyte material to modify or otherwise affect the polymerization reaction or product. U.S. Pat. No. 3,516,941 contains disclosure of detrimental effects found in such encapsulating processes when certain wetting agents are used.

U.S. Pat. No. 3,755,190 issued Aug. 28, 1973 discloses a microencapsulating process wherein the capsule wall material is polyhydroxy phenolic/aldehyde polymeric material generated in the presence of poly(vinyl alcohol).

U.S. Pat. No. 3,726,803 issued Apr. 10, 1973 discloses microcapsules having a composite capsule wall structure of hydrophilic polymeric material interspersed by a hydrophobic polymeric material. The hydrophobic polymeric material is disclosed to be in situ-generated condensate of a polyhydroxy phenolic material and an aldehyde.

U.S. Pat. No. 3,016,308 issued Jan. 9, 1962 discloses encapsulation by continued polymerization of urea/formaldehyde resin dissolved in an aqueous manufacturing vehicle with a polymeric wetting agent. The process utilizes urea/formaldehyde resin as starting material and a slight amount of wetting agent to maintain an emulsion during the continued polymerization.

SUMMARY OF THE INVENTION

Urea/formaldehyde polymeric materials generated in an aqueous capsule manufacturing vehicle result, without more, in brittle films of capsule wall material. Urea/formaldehyde polymeric material generated from an aqueous solution to a molecular weight adequate for phase separation has a tendency to separate from solution as a crystalline, nugget-like, solid. That precipitous phase separation can be controlled to yield a liquid separated phase relatively concentrated in the polymeric material, but the control involves frequent and critical dilutions to maintain proper polymer concentrations. An encapsulating process utilizing the generation of urea/formaldehyde and step-wise and continual dilution of the manufacturing vehicle does yeild capsules of quality adequate for many intended uses despite the frangible and fragile nature of the capsule wall material.

While dilution of the manufacturing vehicle in previously-developed encapsulating processes which utilize urea/formaldehyde polymer generation is required to alleviate the formation of solid nuggets of polymeric material, dilution is also required to maintain the encapsulating system at a workable viscosity. Urea/formaldehyde polymeric material possesses some desirable qualities for use in microcapsule wall material; but previously-disclosed processes have required substantial improvement for generating the polymeric material in commercially-acceptable quantity and quality in the context of microcapsule manufacture.

The process of the present invention provides for manufacture of capsule walls from the polymerization of urea and formaldehyde with the benefits of well-formed urea-formaldehyde polymer but without the disadvantages of required dilution and nugget formation, which plagued prior processes. In regard to these matters of dilution and nugget formation, it is important to note that the encapsulating process of the present invention is conducted effectively and preferably at capsule concentrations higher than previously believed possible. Moreover, at those higher capsule concentrations, in the present process, the system viscosity remains within effective and operable liquid limits.

Additionally, the process of the present invention results in manufacture of capsule walls which are relatively impermeable and strong. The capsule walls of this invention are tough and relatively strong as compared to capsule walls of urea/formaldehyde polymer made in accordance with previously-known processes.

A system component material specially utilized in the present process, which material is believed to be required for realizing any and all of the benefits described herein, is negatively-charged polymeric polyelectrolyte material having a linear aliphatic hydrocarbon backbone with an average of about two carboxyl groups for every four backbone carbon atoms and having the backbone otherwise unsubstituted or having an average of about one methoxy group for every four backbone carbon atoms. Use of the proper kind and amount of this system modifier is necessary to permit the manufacture of microcapsules having urea/formaldehyde wall material in a high capsule concentration, a low vehicle viscosity, and at a beneficially high pH condition.

Poly(vinyl alcohol) has been used, previously, as a supportiing polymer in generation of certain, specific, condensation polymers in processes of microencapsulation. The condensation polymer in those processes is a product of an aldehyde and polyhydroxy phenolic materials having at least two phenolic hydroxy groups. The poly(vinyl alcohol) has been disclosed to form a complex with polyhydroxy phenolic material to enable subsequent condensation between the phenolic material and the aldehyde. Poly(vinyl alcohol) is disclosed as the only eligible supporting polymer and only polyhydroxy phenolic materials having at least two phenolic hydroxy groups are disclosed to be used as coreactants for the aldehyde.

The present invention provides means to use urea/formaldehyde polymeric materials as capsule walls and obtain the benefits therefrom without the previously-disclosed disadvantages. The system modifier of this invention, in some respects, shares similarities with the poly(vinyl alcohol) supporting polymer discussed above. The system modifier of this invention is, however, required to have a carboxyl negative charge in aqueous solution; and even more specifically, only certain carboxyl-substituted materials have been found eligible. While the inventors do not believe that the system modifier forms any strong complex or substantial combination with the urea prior to polymerization, it is believed that the modifier interferes, in some manner, with the polymerization reaction. The mechanism of the interference is not understood, but the effect of the interference is to permit manufacture of microcapsules, en masse, by in situ polymerization of urea and formaldehyde at surprisingly high concentration with surprisingly low viscosity in the manufacturing vehicle.

The role of the system modifier is not well understood and is especially difficult to understand because the modifier is not included in finished capsule walls in appreciable amounts. The system modifier takes some active part in the urea/formaldehyde polymerization reaction as evidenced by reduced viscosity of the system at increased polymer concentration and increased efficiency of the polymerizing component materials with increased optimum pH of polymerization. Nevertheless, the finsihed capsule walls retain only a minor residual amount of the system modifier. To be effective, the system modifier must be included in the encapsulating system before commencement of reaction between the urea and the formaldehyde. The characteristic brittleness of the urea/formaldehyde polymeric capsule wall material is alleviated somewhat by that residue of modifier; and the effect, in most cases, is a fortuitous benefit.

Examples of eligible carboxyl group system modifiers include hydrolyzed maleic anhydride copolymers, which are preferred, such as poly(ethylene-co-maleic anhydride), poly(methylvinylether-co-maleic anhydride), and the like; and polyacrylates, such as poly(acrylic acid), and the like.

In further regard to the preferred system modifiers, there appears to be a molecular weight range within which the best results are obtained. Eligible system modifiers permit and maintain the encapsulating system of polymerizing urea and formaldehyde at reasonably low and workable viscosities. Negatively-charged materials which would otherwise be eligible as system modifiers, are ineligible at molecular weights which are too low. Inexplicably, system modifier materials below a certain molecular weight cause the system to thicken and gel, while materials of an adequately high molecular weight maintain the system viscosity at an acceptable low level. The viscosity effect is not understood, and no explanation is offered, for the low viscosity using high molecular weight system modifiers and the high viscosity using low molecular weight system modifier materials. The critical low molecular weight is not represented by a sharp change from eligibility to ineligibility but by a transition from preferred to viscous to gelled as the molecular weight is decreased. The critical low molecular weight appears, also, to vary somewhat with different kinds of the eligible system modifier materials. For example, preferred poly(ethylene-co-maleic anhydride) should have a molecular weight about 1000; poly(methylvinylether-co-maleic anhydride) above about 250,000; poly(acrylic acid) above about 20,000.

The urea/formaldehyde polymer of this invention is in a slightly broader sense, intended to include amino resins. Amino resins generally include the condensation polymer from reaction between an aldehyde and an amine with at least two amino groups per molecule. Examples of such amines, eligible for use in combination with urea but not alone herein, include melamine (cyanuramide), thiourea, N-alkyl ureas such as 1-methylurea and guanidine. The term "urea/formaldehyde" is used herein to denote amino resins, generally, because urea is always used in some major amount and formaldehyde is the most preferred aldehyde compound.

Material contained by capsule walls of this invention, i.e., the capsular internal phase or capsule core material, is relatively unimportant to the practice of the invention and can be any material which is substantially water-insoluble and which does not interact with the intended capsule wall material, or with other encapsulating-system components, to the detriment of the process. A few of the materials which can be utilized as capsule internal phases include, among a multitude of others: water-insoluble or substantially water-insoluble liquids, such as olive oil, fish oils, vegetable oils, sperm oil, mineral oil, xylene, toluene, kerosene, chlorinated biphenyl, and methyl salicylate; similar substantially water-insoluble materials of a solid but meltable nature such as naphthalene and cocoa butter; water-insoluble metallic oxides and salts; fibrous materials, such as cellulose or asbestos; water-insoluble synthetic polymeric materials; minerals; pigments; glasses; elemental materials; including solids, liquids and gases; flavors, fragrances, reactants; biocidal compositions; physiological compositions; fertilizer compositions; and the like.

The process of this invention specifically and preferredly includes the steps of establishing an aqueous, single-phase, solution of the system modifier and urea into which is dispersed the intended capsule core material (substantially insoluble in the solution and substantially chemically unreactive with any of the solutes). The dispersiing forces are maintained, formaldehyde is added to the system and, on reaction between the urea and the formaldehyde, a urea/formaldehyde polymeric material separates from the solution as a liquid solution phase, in its own right, relatively highly concentrated in urea/formaldehyde. The separated liquid phase containing urea/formaldehyde wets and enwraps particles of the dispersed capsule core material to yield liquid-walled embryonic capsules. Agitation is continued to permit generation and continued reaction urea/formaldehyde material to yield solid and substantially water-insoluble capsule walls. It is important to note that: (a) after make-up of the system and commencement of the capsule-wall-forming condensation reaction, there is no dilution step in the process; (b) the presence of the system modifier permits generation of a high concentration of urea/formaldehyde polymer at a relatively low viscosity; (c) the resulting high concentration-low viscosity system permits liquid phase separation and subsequent polymerization to a solid to produce capsules, en masse, in a, by volume, concentration in the manufacturing vehicle not before possible.

Alternatively, the various system components can be combined in any desired order with only the limitation that the system modifier must be present in the system at the time that the urea/formaldehyde polymerization is begun. The capsule core material can be dispersed in the system at any time before the separated liquid phase of urea/formaldehyde becomes solid or is so polymerized that dispersed capsule core particles are not enwrapped by urea/formaldehyde polymer.

The polymerization reaction, even as altered by the system modifier, is a condensation conducted in an acid medium. The condensation can be accomplished in an aqueous system having a pH of about 0 to 7; —the time and temperature requirements being variable to optimize the reaction. As an effect of the system modifier and its relation to the condensation, the preferred pH for operation of this invention is from 2.5 to 5.0 and the most preferred pH is 3.5.

As to the amounts of urea and formaldehyde which should be used, it has been found that the molar ratio of formaldehyde to urea must be at least 1.6, is preferably from 1.6 to about 3.

After the reaction has progressed to the point where the capsule walls have been solidified and, in that respect, the capsule manufacture is completed, the capsules can be separated from the manufacturing vehicle by filtering, washed with water; and the capsule walls can be dried by placing the capsules in a forced air dryer. It should be understood, however, that the capsules need not have dried walls or even be separated from the liquid vehicle prior to their use. If it is desired or required for some intended purpose, the capsule product of this invention can be supplied as a slurry of capsules in a liquid carrier, either the manufacturing vehicle or not, such as for use in a paper-coating composition, a paint, an insecticide composition, or the like—such uses being previously taught in the prior art.

Individual capsules prepared by the present invention are substantially spherical and can be manufactured having diameters of less than 1 micron to about 100 microns—the preferred size range being from about 1 to about 50 microns, in diameter. The capsule product of this invention can be made to take the form either of individual capsules with each entity having, as an internal phase, one particle of capsule core material or of aggregates of individual capsules with each aggregate entity having several particles of capsule core material. Capsule aggregates can be made in sizes from a few microns in diameter to several hundred microns in diameter depending upon the size and state of the included core material.

DESCRIPTION OF THE PREFERRED EMBODIMENTS

Unless otherwise specified, all percentage and part designations indicate percent and parts, by weight; and all temperature designations indicate degrees centigrade.

EXAMPLE 1

In this preferred example, negatively-charged poly-(ethylene-co-maleic anhydride) is used to modify a urea/formaldehyde encapsulating system to yield capsules in the size range of 5 to 15 microns. The capsule contents is an oily solution of colorable dye materials for use in carbonless copying paper, as will be described below in relation to testing the capsule product of this example. The capsule contents is termed "internal phase". A suitable poly(ethylene-co-maleic anhydride) includes approximately equimolar ethylene and maleic anhydride and has a molecular weight of about 75,000 to 90,000 such as, for example, the product sold by Monsanto Chemical Company, St. Louis, Missouri, under the trademark "EMA-31".

Into a blending vessel having about a one liter capacity and equipped for agitation and heating are placed: 100 grams of a 10 percent aqueous solution of hydrolyzed poly(ethylene-co-maleic anhydride) as the system modifier; 10 grams of urea; 1 gram of resorcinol; and 200 grams of water, as the manufacturing vehicle. The pH is adjusted to 3.5 using 20 percent aqueous sodium hydroxide; and 200 milliliters of internal phase is emulsified into the manufacturing vehicle to yield mobile internal phase droplets of an average size of less than about 10 microns in a single-phase solution of the manufacturing vehicle. Twenty-five grams of formalin (37 percent aqueous formaldehyde solution) is added to the system. The agitation is maintained, the system is heated to about 55°, and under continued agitation, the temperature is maintained for about two hours and then permitted to decrease to ambient (about 25°).

This example utilizes a molar ratio of formaldehyde/urea of about 1.9 and contains about 6 percent of urea and formaldehyde and 3 percent of system modifier in the manufacturing vehicle (excluding consideration of the internal phase). The capsules of oily dye solution are uniformly in a size range of about 1 to 15 microns and represent more than 40 percent, by volume, of the encapsulating system. The oily dye solution comprises 3,3-bis-(4-dimethylaminophenyl)-6-dimethylaminophthalide (commonly known as Crystal Violet Lactone) and 3,3-bis-(1-ethyl-2-methylindol-3-yl)phthalide (sometimes known as Indolyl Red) in a mixture of solvents including a benzylated ethyl benzene and a relatively high-boiling hydrocarbon oil, such as one having a distillation range of 400°–500° Fahrenheit.

The capsule product from this example will be compared, below, with capsule products from the next two examples.

EXAMPLE 2

This example is identical with Example 1 with the exception that the system modifier is omitted from the manufacturing vehicle. The initial manufacturing vehicle composition is 10 grams of urea, 1 gram of resorcinol, and 300 grams of water and the materials and the procedure are otherwise unchanged. It should be noted that the colorable dye material encapsulated in this series of examples react to yeild a colored reaction product and thereby become increasingly soluble in the manufacturing vehicle below a pH of about 2.7. To prevent such coloration of the dye, the system pH is kept above pH 2.7 and is preferably maintained at about 3.5.

This example also utilizes a molar ratio of formaldehyde/urea of about 1.9 and contains about 6 percent of urea and formaldehyde in the manufacturing vehicle. The capsule materials in this example represent more than 40 percent, by volume, of encapsulating system although the internal phase droplet size varies considerably (from about 5 up to as much as 300 microns) due to a lack of stability in the emulsification. It is noted that most of the capsule materials are not utilized;—the internal phase being unacceptably encapsulated and nuggets and solid particles of urea/formaldehyde polymer existing free in the system.

EXAMPLE 3

This example is identical with Example 1 with the exception that poly(vinyl alcohol) is substituted for the negatively-charged, poly(ethylene-co-maleic anhydride). While the poly(vinyl alcohol) does appear to serve as an effective emulsifier or protective colloid to permit control of dispersed droplet size, it has no effect or perhaps even an adverse effect on the condensation reaction. Capsules are not formed in this example although the system evidences a large amount of undeposited solid material which results from the urea/formaldehyde reaction and is unuseable as capsule wall material.

EXAMPLE 4

This example is identical with Example 1 with the exception that poly(acrylic acid) is substituted for the poly(ethylene-co-maleic anhydride). Poly(acrylic acid) is among the eligible system modifiers in providing the beneficial effect on the urea/formaldehyde condensation. Control of the capsule size range has been found to be more difficult using poly(acrylic acid), but the capsule quality is comparable with that of Example 1. The capsules range in size from about 1 to 100 microns. A suitable poly(acrylic acid) may have an average molecular weight of more than about 150,000 and less than about 300,000 such as, for example, the product sold by Rohm and Haas Company, Philadelphia, Pennsylvania, under the trademark "Acrysol A-3".

Because the size of capsules made in the above examples is so small and because the intended capsule use is in carbonless copying papers, the capsules of the above examples are tested by methods which relate to effectiveness in a copying paper use. As a general description, the capsules are coated onto a sheet termed a "CB Sheet" (sheet with Coated Back) and are tested in conjunction with a standardized sheet termed a "CF Sheet" (sheet with Coated Front). The coating of the CB Sheet includes about 75 percent capsules, 18 percent wheat starch, and 7 percent of gum binder such as, for example, hydroxyethylether of corn starch or other water-soluble starch derivatives; and is made up by combining 100 parts of aqueous capsule slurry having 40 percent capsules, 125 parts of water, 10 parts of wheat starch and 40 parts of a 10 percent aqueous solution of the gum binder—all adjusted to about pH 9. The coating is cast using a wire-wound rod designed to lay a 20 pounds per ream (3300 square feet) wet film coating.

The coating of an exemplary CF Sheet includes a metal-modified phenolic resin reactive with the dyes, kaolin clay and other additiments and binder material. A CF Sheet is described in U.S. Pat. No. 3,732,120.

When a CB Sheet and a CF Sheet are placed in coated face-to-coated face relation and pressure is applied, capsules of the CB Sheet rupture and capsule-contained material is transferred to and reacted with the acid component of the CF Sheet to yield a color. A test associated with such capsule rupture and color formation is Typewriter Intensity (TI) and TI values indicate ratios of reflectances--the reflectances of marks produced on the CF Sheet by a typewriter striking two sheets together versus the paper's background reflectance. A high value indicates little color development and a low value indicates good color development.

$$TI = \frac{\text{Printed Character Reflectance}}{\text{Background Reflectance}} \times 100.$$

Reflectances of a more-or-less solid block of print made with an upper-case "X" character and of the background paper are measured on an opacimeter within twenty minutes after the print is made, first, using freshly prepared CB Sheets and, then, using CB Sheets aged in an oven at 100°. A small difference between the TI values indicates good capsule quality. After the oven aging, a TI value of 100 indicates complete loss of solvent from the capsules and a TI value less than 70 evidences acceptable capsules for these tests. When an initial TI value is less than 70, a TI value difference between initial and aged samples of less than about 5 is acceptable for these tests; but, of course, a difference of less than 3 is much preferred.

|  | TI | |
| --- | --- | --- |
|  | Initial | Aged (time) |
| Example 1 | 58 | 60 (one day) |
| Example 2 | 96 | 100 (one hour) |
| Example 3 | 81 | 100 (one hour) |
| Example 4 | 47 | 47 (one day) |

Of course, any convenient and reliable method for exhibiting comparative capsule quality can be used. In the above examples, it should be noted that the particular coating formulation or coating materials are neither critical nor important and can be varied or substituted, as desired or required to fit a particular situation. The resorcinol is not necessary and can be omitted or can be replaced by another material such as orcinol or gallic acid. If used, the resorcinol or other material can be present in the system in amounts of 5 to 30 percent, or more, based on the urea.

EXAMPLE 5

In this example, capsules are prepared at a high capsule solids concentration of more than 60 percent, by volume, capsules in only about 40 percent, by volume, of aqueous manufacturing vehicle. Forty parts of 10 percent aqueous system modifier solution, 20 parts of water, 4 parts of urea, and 90 parts of internal phase are combined under emulsifying agitation similar to that of previous examples. The pH is adjusted to about 3.5, the temperature is raised to about 55°, and the emulsification is continued to a droplet size of less than 10 microns. Ten parts of formalin is then added to the system and stirring is maintained for about three hours. The viscosity of the system increases considerably as the urea/formaldehyde polymerization reaction progresses. The viscosity appears to be a function of polymer growth and deposition onto capsule walls, however, because the encapsulating system does not show a tendency to gel so long as the system modifier is used. The system of this example can be permitted to stand without agitation after the first three hours of reaction; and the capsules will, nevertheless, remain individual and unagglomerated. The capsules are easily redispersed after settling in the manufacturing vehicle without agitation.

Results from tests on capsules prepared in this example are set out in the following table. Results are shown for capsules prepared using poly(ethylene-co-maleic anhydride) of two different molecular weights as system modifiers. The TI test results are identified by system modifier molecular weight.

| Molecular Weight | Initial TI | Aged 100 degrees TI (1–3 days) | (1 week) |
| --- | --- | --- | --- |
| 15,000–20,000 | 56 | 58 | 58 |
| 75,000–90,000 | 57 | 59 | 58 |

When the high concentration encapsulation is attempted by omitting the system modifier or by replacing the system modifier by a nonionic or a positively-charged polymer, no acceptable capsules are produced. For example, when poly(vinyl alcohol) is used, the results are much like those of Example 3, with the exception that, during the condensation reaction, the viscosity of the system increases so much that it cannot be poured without dilution, even at 55°.

EXAMPLE 6

In this example, three series of different system modifiers are used in accordance with the procedure generally described in Example 1. When the capsules contain the oily internal phase of dye solution described above; and, when the capsule quality is tested as above, the test results are:

TI

| System Modifier | Initial | Aged 100° (one day) |
| --- | --- | --- |
| poly(ethylene-co-maleic anhydride) | | |
| M.W.  75,000–90,000 | 58 | 60 |
| 15,000–20,000 | 55 | 57 |
| 5,000– 7,000 | 55 | 57 |
| 1,500– 2,000[1] | 54 | 61 |
| poly(methylvinylether-co- | | |

TI-continued

| System Modifier | Initial | Aged 100° (one day) |
| --- | --- | --- |
| maleic anhydride) | | |
| M.W.  1,125,000 | 55 | 56 |
| 750,000 | 61 | 62 |
| 250,000 | 64 | 94 |
| poly(acrylic acid) | | |
| M.W.  less than 300,000 | 43 | 45 |
| less than 150,000 | 47 | 47 |
| less than  50,000[2] | 50 | 59 |

[1]To demonstrate flexibility in the amount of system modifier which can be used, only one-half as much is used here as is used in the similar materials of higher molecular weight.
[2]To demonstrate flexibility in the amount of system modifier which can be used, twice as much is used here as is used in the similar materials of higher molecular weight.

The amounts and kinds of encapsulating system materials used in these examples are any of those previously disclosed. The pH of the encapsulating system can be pH 0–7 and the formaldehyde to urea mole ratio can be from 1.6 to 3. As the pH of the system is increased, it is helpful to increase the temperature of the encapsulating system also. Eligible temperatures of operation range from about 25° to 75° or higher;— about 50°–55° being preferred.

By adjusting the degree of agitation, droplets of liquid intended capsule core material can be produced of any size from a few to several hundred microns. Moreover, the amount of intended capsule core material can be altered to alter the amount of completed capsule which is internal phase as opposed to capsule wall material. Capsules can generally be made from less than 50 percent internal phase to 95 percent internal phase, or more.

The amount of system modifier in the encapsulating system appears to be important in practice of this invention with respect to the minimum amount to assure adequate interference with the urea/formaldehyde reaction and with respect to the maximum amount as an economic matter. Of course, if the system modifier is present in very high concentrations, the system viscosity will be inoperably high. As a general rule, the encapsulating system should include at least 0.75 percent system modifier. At the other extreme, it must be remembered that the variety of eligible materials precludes establishment of an exact general maximum due to differences in solution viscosity among the several materials. It can be said that more than 10 percent is seldom used or required.

What is claimed is:
1. A process for manufacturing minute capsules, en masse, in an aqueous manufacturing vehicle, comprising the steps of:
   a. establishing an agitating single-phase aqueous solution system including urea and a system modifier material present as 0.75 to 10 percent, by weight, of the aqueous manufacturing vehicle, selected from the group consisting of poly(ethylene-co-maleic anhydride), poly(methylvinylether-co-maleic anhydride), and poly(acrylic acid),
   b. dispersing into the solution system particles of an intended capsules core material substantially insoluble in the system
   c. adding formaldehyde to the system
   d. continuing agitation of the system to yield a polymerization reaction between the urea and the formaldehyde resulting in i. liquid-liquid phase separation of the urea/formaldehyde polymerization product above a molecular weight to be soluble in the system and ii. continued reaction of the separation liquid polymerization product to solid capsule wall material individually surrounding particles of the dispersed intended capsule core.

2. The process of claim 1 wherein the poly(ethylene-co-maleic anhydride) has a molecular weight of greater than about 1000, the poly(vinylmethylether-co-maleic anhydride) has a molecular weight of greater than about 250,000 and the poly(acrylic acid) has a molecular weight of greater than about 20,000.

3. The process of claim 1 wherein the aqueous manufacturing vehicle is less than 60 percent, by volume, of the system.

4. The process of claim 1 wherein the aqueous manufacturing vehicle is less than 50 percent, by volume, of the system.

5. The process of claim 1 wherein the solution system includes a material selected from the group consisting of resorcinol, orcinol and gallic acid.

6. The process of claim 5 wherein the material selected from the group consisting of resorcinol, orcinol and gallic acid is present in amount of 5 to 30 percent, by weight, of urea.

7. The process of claim 1 wherein the pH of the aqueous manufacturing vehicle is maintained between 3 and 7 through steps (c) and (d).

8. A process for manufacturing minute capsules, en masse, in an aqueous manufacturing vehicle, comprising the steps of:

a. establishing an agitating single-phase aqueous solution system including a system modifier material present as 0.75 to 10 percent, by weight, of the aqueous manufacturing vehicle, selected from the group consisting of poly(ethylene-co-maleic anhydride), poly(methylvinylether-co-maleic anhydride), and poly(acrylic acid)

b. dissolving urea and formaldehyde in the aqueous system, the urea and the formaldehyde reacting together in the presence of the system modifier to yield a liquid-liquid-phase-separated polymerization product c. dispersing in the system particles of an intended capsule core material substantially insoluble in the system and substantially unreactive with the components of the system, the dispersed particles being wet and enwrapped by the liquid, phase separated, polymerization product d. continuing agitation of the system to further polymerize the urea and formaldehyde material into solid capsule wall material insoluble in the system.

* * * * *